United States Patent Office 3,825,595
Patented July 23, 1974

3,825,595
N-CYCLOPENTYL-N-2-HYDROXYALKYL-RING-SUBSTITUTED BENZAMIDES
William D. Roll, Toledo, Ohio, assignor to The University of Toledo, Toledo, Ohio
No Drawing. Continuation-in-part of abandoned application Ser. No. 123,842, Mar. 12, 1971. This application May 15, 1972, Ser. No. 253,520
Int. Cl. C07c 103/22
U.S. Cl. 260—558 R          8 Claims

ABSTRACT OF THE DISCLOSURE

Simultaneously acting central nervous system (CNS) depressants and blood pressure depressors of the formula

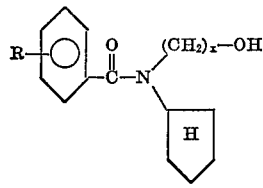

wherein R is selected from the group consisting of hydrogen, lower alkyl, lower alkoxy, and halogen radicals; and wherein $x$ is a whole number from one to three.

---

This in a continuation-in-part of applicant's copending application S.N. 123,842 filed Mar. 12, 1971.

BACKGROUND OF THE INVENTION

Although similar N-hydroxyalkyl benzamides are known, only applicant's own article published in the Journal of Medicinal Chemistry Volume 13, pages 303–4 (March 1970) showed these compounds to have both CNS depressant and blood pressure depressor effects. Examples of other similar compounds not having these effects are: the Margolis U.S. Pat. No. 2,999,050 patented Sept. 5, 1961 is for a skeletal muscle relaxant; the Horrom Pat. No. 3,066,167 patented Nov. 27, 1962 is for skeletal muscle relaxant, tranquilizer, anti-convulsant, and anti-emetic activities; the Paulshock Pat. No. 3,342,679 patented Sept. 19, 1967 is for an anti-convulsant; and V. D. Wiebel Hans et al. article in the Journal of Laboratory and Clinical Medicine Volume 49, pages 651–6 (April 1957) which only refers to a metabolite excreted in urine.

SUMMARY OF THE INVENTION

A. The Compounds

The new compounds of this invention have central nervous system depressant activity in small animals such as rats and mice, and in dosages of 5 milligrams per kilogram of the animal, they also produce a drop in blood pressure in these animals.

The new compounds have the general formula:

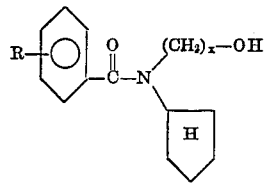

wherein R may be fluoro-, chloro-, bromo-, iodo-, methoxy-, ethoxy-, methyl-, or ethyl- radicals substituted in the ortho-, meta-, or para-positions, but preferably monochloro-, monomethoxy- or monomethyl-radicals in the para-position. The N-radical of the benzamide may comprise a hydroxymethyl-, hydroxyethyl-, or hydroxypropyl-radical, but preferably the 2-hydroxyethyl-radical, which together with the halo-, methoxy-, or methyl-radicals on the phenyl ring of the benzamide confers the proper physicochemical properties on these compounds which are necessary for maximal activity in the animals tested. Although the N-2-hydroxyethyl-radical is preferred, the N-2 hydroxypropyl-radical also is good. The N-2-hydroxymethyl is less effective than N-2-hydroxyethyl-radical, and those N-2-hydroxyalkyl radicals of four or more carbon atoms produce no significant depressant action in any practical dosages. Furthermore these N-cyclopentyl-N-2-hydroxyalkyl ring substituted benzamides were found to have superior depressant and hypotensive effects to applicant's cyclohexyl compounds mentioned in his article above.

B. Their Preparation

The new compounds according to this invention were prepared by the following equation:

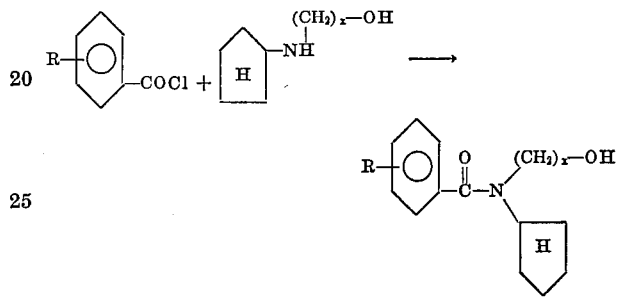

Herein equimolar amounts of the substituted benzoyl or aracyl halide was reacted with a well stirred solution of N-(2-hydroxyalkyl)-cyclopentamine in triethylamine and dimethylacetamide at a temperature between about 0° and 10° C. When the addition of the aracyl halide solution was completed, the crude substituted benzamide was precipitated by the addition of cold water and collected. This crude product was crystallized from aqueous ethanol to give the pure new compounds of this invention, which were tested for composition and physical properties. The results of some of these tests on the preferred N-cyclopentyl-N-2-hydroxyethyl- methoxy-, chloro-, and methyl-benzamides are shown in the following Table I:

TABLE I

| Example number | Phenyl ring substituted radical | Percent yield by above process | Melting points in ° C. | Calculated C | Calculated H | Analyzed C | Analyzed H |
|---|---|---|---|---|---|---|---|
| 1 | p-CH₃O— | 80 | 60.7 | 68.15 | 8.04 | 68.20 | 8.14 |
| 2 | m-CH₃O— | 71 | Oil | 68.15 | 8.04 | 68.18 | 8.08 |
| 3 | o-CH₃O— | 69 | Oil | 68.15 | 8.04 | 68.10 | 8.00 |
| 4 | p-Cl— | 83 | 101.6 | 62.80 | 6.78 | 62.80 | 6.79 |
| 5 | m-Cl— | 75 | Oil | 62.80 | 6.78 | 62.73 | 6.75 |
| 6 | o-Cl— | 75 | Oil | 62.80 | 6.78 | 62.75 | 6.80 |
| 7 | p-CH₃ | 82 | 40.8 | 72.84 | 8.56 | 72.85 | 8.60 |
| 8 | m-CH₃ | 74 | Oil | 72.84 | 8.56 | 72.80 | 8.60 |
| 9 | o-CH₃ | 68 | Oil | 72.84 | 8.56 | 72.81 | 8.59 |

The infrared absorption for C=O was 6.04–6.1 microns and OH was 2.96 microns for each of the above nine examples or compounds.

C. Their Pharmacology

The activity of these new compounds was tested by dissolving them in propylene glycol and administering their resulting solutions orally and intraperitoneally into small animals such as rats and mice in dosages of one, three, five and seven milligrams per kilogram of weight of the animals administered. The depressant effect of the new compounds was determined in C3H mice weighing between 20 and 25 grams with actophotometers which measure the total movements of a single animal each fifteen minute interval over a one hour period, and the mean count for each period for eight animals for each compound was recorded. Eight additional mice were administered the same amount of chloropromazine, a well known CNS depressant (tranquilizer), and the results obtained are listed in the following table which shows all these new compounds to be more active than chlorpromazine at least in some dosages, and the para substituted benzamides to be the most active.

TABLE II.—EFFECTS ON THE SPONTANEOUS ACTIVITY IN MICE

| Compound | Dose mg./kg. | Percent reduction in spontaneous act |
|---|---|---|
| Chlorpromazine | 1.0 | 2.5 |
|  | 3.0 | 42.4 |
|  | 5.0 | 60.0 |
|  | 7.0 | 75.2 |
| 1 | 1.0 | 10.0 |
|  | 3.0 | 57.5 |
|  | 5.0 | 70.3 |
|  | 7.0 | 91.0 |
| 2 | 1.0 | 8.0 |
|  | 3.0 | 48.9 |
|  | 5.0 | 50.5 |
|  | 7.0 | 73.2 |
| 3 | 1.0 | 15.2 |
|  | 3.0 | 60.4 |
|  | 5.0 | 64.8 |
|  | 7.0 | 80.2 |
| 4 | 1.0 | 15.0 |
|  | 3.0 | 65.2 |
|  | 5.0 | 75.5 |
|  | 7.0 | 96.8 |
| 5 | 1.0 | 10.2 |
|  | 3.0 | 50.0 |
|  | 5.0 | 54.3 |
|  | 7.0 | 77.9 |
| 6 | 1.0 | 8.2 |
|  | 3.0 | 49.5 |
|  | 5.0 | 50.1 |
|  | 7.0 | 69.9 |
| 7 | 1.0 | 15.8 |
|  | 3.0 | 70.1 |
|  | 5.0 | 79.4 |
|  | 7.0 | (100) |
| 8 | 1.0 | 6.9 |
|  | 3.0 | 45.2 |
|  | 5.0 | 56.1 |
|  | 7.0 | 75.3 |
| 9 | 1.0 | 12.7 |
|  | 3.0 | 60.9 |
|  | 5.0 | 68.2 |
|  | 7.0 | 89.9 |

The direct blood pressure measurements for each new compound were conducted in eight Wistar rats by injecting 5 mg./kg. via the femoral vein. These rats were under urethane anesthesia (1.2 g./kg. i.p.), and the direct blood pressure measurements were made with a mercury manometer connected to the carotid artery. Compounds 1, 4 and 7 in Table I showed 50, 60 and 45 mm. drops in blood pressure, respectively.

Indirect blood pressure measurements were also conducted in normotensive Wistar rats by injecting 5 mg./kg. intraperitoneally, and the systolic blood pressure was determined by using a photoelectric tensometer. The mean response of eight test animals and eight control animals was used to determine the percent reduction in blood pressure produced by each tested compound. The results of these pharmacological tests for each new compound listed in Table I above are shown in the following Table III:

TABLE III.—HYPOTENSIVE ACTIVITY IN NORMOTENSIVE RATS

| Compound | Percent reduction of control blood pressure, time following administration— | | | | |
|---|---|---|---|---|---|
|  | 15 min. | 30 min. | 60 min. | 90 min. | 120 min. |
| 1 | 28.0 | 33.1 | 40.0 | 15.0 | 0.0 |
| 4 | 20.5 | 50.9 | 63.6 | 29.2 | 10.5 |
| 7 | 40.8 | 35.5 | 21.2 | 15.3 | 0.0 |

DETAILED DESCRIPTION OF SOME PREFERRED EMBODIMENTS

Example 1

N-cyclopentyl - N - (2-hydroxyethyl)-p-methoxybenzamide was prepared by adding a mixture of 25 milliliters of dimethylacetamide, 0.01 mole of p-methoxybenzoyl chloride to a cooled solution (ice bath) containing 0.01 mole of N-2-hydroxyethylcyclopentylamine, 25 milliliters of dimethylacetamide and 0.01 mole of triethylamine. When the addition of the p-methoxybenzoyl chloride solution was completed the crude N-cyclopentyl-N-(2-hydroxyethyl)-p-methoxybenzamide was precipitated by the addition of cold water and collected. This crude product was recrystallized from aqueous ethanol to form the pure N-cyclopentyl-N-(2-hydroxyethyl)-p-methoxybenzamide of this Example.

This new compound was then tested according to the Table I above in which the carbon and hydrogen content were obtained with a Coleman Carbon-Hydrogen analyzer. The melting point was determined by using a Mettler FP-1 melting and boiling point apparatus. The infrared absorption spectrum was obtained with a Perkin-Elmer Model 137-B spectrophotometer.

The oral administration of one, three, five and seven milligrams per kilogram of this compound dissolved in propylene glycol resulted in a significant reduction in the spontaneous motor activity of the mice (see Table II above).

Example 2

N-cyclopentyl - N - (2 - hydroxyethyl)-m-methoxybenzamide was prepared from m-methoxybenzoyl chloride and N-(2-hydroxyethyl)cyclopentylamine in the same manner as that employed in Example 1 above. The resulting compound was also tested as described in Example 1 above, and as shown in Tables I, II above.

Example 3

N-cyclopentyl - N - (2 - hydroxyethyl)-o-methoxybenzamide also was produced in the manner described in Example 1 above. This new compound was similarly tested as described above and as shown in Tables I, II, and III. It was shown to have both CNS depressant and blood pressure depressor activity in dosages of 5 mg./kg.

Example 4

N - cyclopentyl-N-(2-hydroxyethyl)-p-chlorobenzamide was also produced according to the process described for Example 1 above and similarly tested as shown in Tables I, II and III. Oral and intraperitoneal doses of this compound of five milligrams per kilogram in propylene glycol produced a high degree of depression and blood pressure depressor activity as shown in Tables II and III above.

Example 5

N - cyclopentyl-N-(2-hydroxyethyl)-m-chlorobenzamide was produced similar to the process described in Example 3, and it had pharmacological effects similar to those for the compound of Example 2 as shown in Table II.

Example 6

N-cyclopentyl - N - (2-hydroxyethyl)-o-chlorobenzamide was produced according to the process described for Example 1 and was tested to have properties about the same as the compound of Example 2.

Example 7

N-cyclopentyl - N - (2 - hydroxyethyl)-p-methylbenzamide was produced according to the process described for Example 1 and was tested to have properties as shown in Tables I, II and III. This compound had the greatest CNS depressant action, and its blood pressure depressor action had the fastest onset.

Example 8

N-cyclopentyl - N - (2 - hydroxyethyl)-m-methylbenzamide was produced according to the process described for Example 1 and was tested to have properties as shown in Tables I and II.

Example 9

N-cyclopentyl - N - (2 - hydroxyethyl)-o-methylbenzamide was produced according to the process described for Example 1 and was tested to have properties as shown in Tables I and II.

While there is described above the observed principles of this invention in connection with a specific group of compounds, it is to be clearly understood that there may be many unobserved additional effects which could contribute substantially to the effectiveness of these compounds, and that the foregoing description is made only by way of example and not as a limitation to the scope of these compounds.

I claim:

1. A compound of the formula

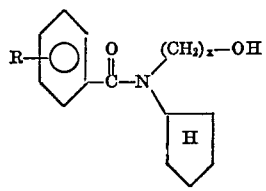

wherein R is selected from the group consisting of methyl, methoxy, chloro radicals, and wherein $x$ is a whole number from one to three.

2. A compound according to claim 1 wherein $x$ is 2.
3. A compound according to claim 1 wherein R is chloro.
4. A compound according to claim 1 wherein R is methoxy.
5. A compound according to claim 1 wherein R is methyl.
6. N-cyclopentyl-N-(2 - hydroxyethyl)-p-methylbenzamide.
7. N - cyclopentyl-N-(2 - hydroxyethyl)-p-chlorobenzamide.
8. N - cyclopentyl-N-(2 - hydroxyethyl)-p-methoxybenzamide.

References Cited

Roll, J. Med. Chem., vol. 13, pp. 303–04 (1970).

HARRY I. MOATZ, Primary Examiner

U.S. Cl. X.R.

260—558 D, 559 R; 424—324

PO-1050
(5/69)

UNITED STATES PATENT OFFICE
CERTIFICATE OF CORRECTION

Patent No. 3,825,595                     Dated July 23, 1974

Inventor(s)    William D. ROLL

It is certified that error appears in the above-identified patent and that said Letters Patent are hereby corrected as shown below:

Column 1, lines 28 and 29 cancel "This is a continuation-in-part of applicant's co-pending application Serial No. 123,842 filed March 12, 1971."
Column 3, line 1, change "chloropromazine" to - - chlorpromazine - - .

Signed and sealed this 24th day of December 1974.

(SEAL)
Attest:

McCOY M. GIBSON JR.                 C. MARSHALL DANN
Attesting Officer                   Commissioner of Patents